United States Patent
Sakurai et al.

(10) Patent No.: US 7,728,876 B2
(45) Date of Patent: Jun. 1, 2010

(54) IMAGING APPARATUS HAVING CAMERA CONTROL UNIT AND SEPARATE CAMERA HEAD

(75) Inventors: Tetsuo Sakurai, Kumagaya (JP); Masatoshi Ookubo, Iruma (JP); Hidetaka Nakamura, Kawasaki (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 0 days.

(21) Appl. No.: 12/333,991

(22) Filed: Dec. 12, 2008

(65) Prior Publication Data

US 2009/0244295 A1    Oct. 1, 2009

(30) Foreign Application Priority Data

Mar. 31, 2008   (JP) .............................. 2008-090308

(51) Int. Cl.
  H04N 5/232    (2006.01)
  H04N 5/217    (2006.01)
(52) U.S. Cl. .............................. 348/211.14; 348/222.1; 348/241
(58) Field of Classification Search ........................ None
  See application file for complete search history.

(56) References Cited

U.S. PATENT DOCUMENTS

| | | | |
|---|---|---|---|
| 5,406,329 A * | 4/1995 | Kashimura et al. | 348/175 |
| 5,486,853 A * | 1/1996 | Baxter et al. | 348/222.1 |
| 6,437,824 B1 * | 8/2002 | Suzuki et al. | 348/222.1 |
| 6,441,851 B1 * | 8/2002 | Yonemoto | 348/294 |
| 7,586,526 B2 * | 9/2009 | Kurokawa et al. | 348/243 |
| 2007/0013799 A1 * | 1/2007 | Hirota et al. | 348/311 |
| 2008/0225141 A1 * | 9/2008 | Ogawa | 348/251 |
| 2009/0256934 A1 * | 10/2009 | Usami et al. | 348/241 |

FOREIGN PATENT DOCUMENTS

| | | |
|---|---|---|
| JP | 04-258091 | 9/1992 |
| JP | 07-312710 | 11/1995 |
| JP | 07-322118 | 12/1995 |
| JP | 09-083851 | 3/1997 |
| JP | 09-181936 | 7/1997 |
| JP | 10-224672 | 8/1998 |
| JP | 11-341337 | 12/1999 |
| JP | 11-355645 | 12/1999 |
| JP | 2002-232790 | 8/2002 |
| JP | 2002-369072 | 12/2002 |
| JP | 2005-151081 * | 6/2005 |
| JP | 2005-311535 | 11/2005 |
| JP | 2006-180293 | 7/2006 |

* cited by examiner

*Primary Examiner*—Ngoc-Yen T Vu
(74) *Attorney, Agent, or Firm*—Blakely, Sokoloff, Taylor & Zafman LLP

(57) ABSTRACT

An imaging apparatus includes: a camera head that is provided with an image pickup device that outputs an image signal; a camera control unit that is connected to the camera head with a camera cable and outputs a video signal based on the image signal; a CDS circuit that performs co-related double sampling on the image signal; a pulse generator that outputs sample pulses to the CDS circuit; a phase adjusting unit that performs phase adjustment on a clock signal and outputs the adjusted clock signal to the pulse generator; a peak search unit that searches for a peak range in the image signal being performed with the co-related double sampling by the CDS circuit; and a phase control unit that controls the phase adjustment by the phase adjusting unit based on a result of the search by the peak search unit.

8 Claims, 10 Drawing Sheets a: IMAGE PICKUP MODE
b: TEST MODE

IMAGING APPARATUS HAVING CAMERA CONTROL UNIT AND SEPARATE CAMERA HEAD

CROSS REFERENCE TO RELATED APPLICATION(S)

The present disclosure relates to the subject matters contained in Japanese Patent Application No. 2008-090308 filed on Mar. 31, 2008, which are incorporated herein by reference in its entirety.

FIELD

The present invention relates to an imaging apparatus having a camera control unit and a camera head separate from the camera control unit.

BACKGROUND

As a small-sized camera system, there has been used an imaging apparatus having a camera control unit and a camera head separate from the camera control unit, the camera head being employed with an imaging device such as a charge coupled device (CCD).

The imaging apparatus having such separate camera head is provided with the camera head (also simply referred to as a camera head) and a camera control unit (CCU). The camera head outputs a pixel signal (image signal) obtained by an image pickup device such as a charge coupled device (CCD). The CCU has a signal processing circuit for obtaining a video signal to display an image based on the pixel signal output from the camera head. The camera head and the CCU are connected to each other by a dedicated camera cable.

The imaging apparatus outputs the video signal from the CCU to a display device so that an image of a subject captured by the camera head can be observed on a screen of the display device.

An example of a conventional imaging apparatus having a separate camera head is disclosed in JP-A-11-341337. The imaging apparatus disclosed in this publication is designed to correct a phase difference generated between a first synchronizing signal for driving the camera head and a second synchronizing signal for setting timing of the signal processing circuit due to the length of the camera cable to thereby correct a delay time caused by the cable length.

The conventional imaging apparatus having the separate camera head is configured to have the camera cable having a given length for connecting the camera head and the CCU.

However, the length of the camera cable slightly varies due to a manufacturing margin even when the length is designed to be the given length.

When the ratio of the variation to the length of the cable is constant, the individual variation of the cable length increases as the length of the camera cable is designed to be longer. The time required for signal transmission becomes longer as the length of the camera cable increases. Accordingly, when the camera cable is long, the variation of the signal delay time caused by the individual variation of the cable length becomes larger.

Moreover, when the band of the signal used in the imaging apparatus is widened and the resolution or frame rate becomes higher, the requirement to reduce the variation of the signal delay time becomes severe. It is therefore necessary to improve various specifications of the camera cable to a higher level to reduce the variation range of the delay time.

There is however a limit to improve specifications of the camera cable with respect to the variation of the delay time. It is therefore preferable that the imaging apparatus can suitably perform signal processing in accordance with the delay time of the camera cable to keep desired performance.

BRIEF DESCRIPTION OF THE DRAWINGS

A general configuration that implements the various feature of the invention will be described with reference to the drawings. The drawings and the associated descriptions are provided to illustrate embodiments of the invention and not to limit the scope of the invention.

FIGS. 8A and 8B are graphs showing plotting of the output signal level of the CDS circuit when the phases of sample pulses are changed, wherein FIG. 8A shows the case where the peak range is wide, and wherein FIG. 8B shows the case where the peak range is narrow.

DETAILED DESCRIPTION OF THE EMBODIMENTS

Figure 1:
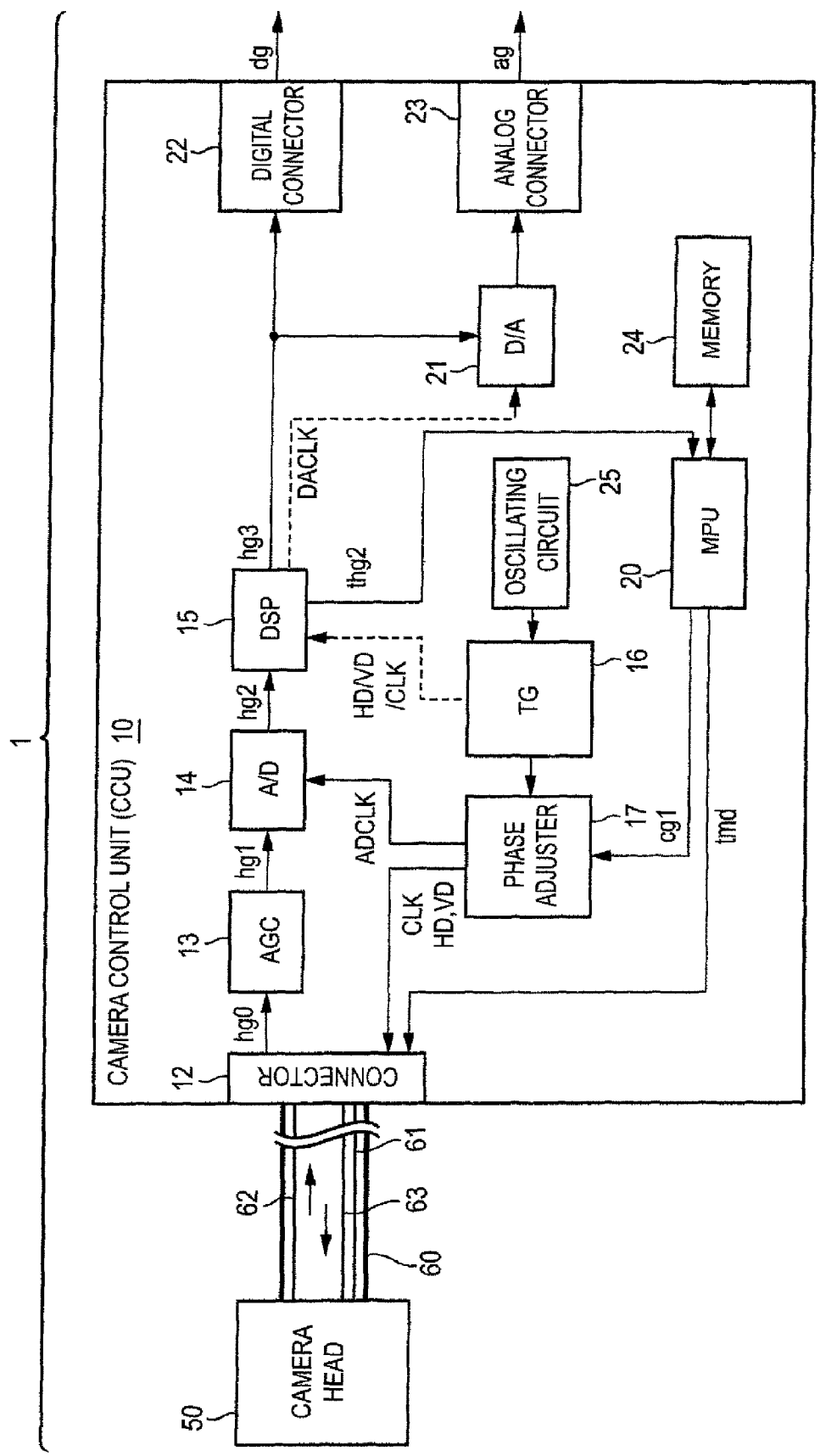
FIG. 1 is a block diagram showing a configuration of an imaging apparatus according to an embodiment of the invention.

Embodiments of the invention will be described below. In the following description, same or similar components are denoted by same reference numerals and a duplicate description will be omitted.

FIG. 1 is a block diagram showing a configuration of an imaging apparatus 1 according to an embodiment of the invention. The imaging apparatus I according to this embodiment includes a CCU 10, a camera head 50, and a camera cable 60. The CCU 10 and the camera head 50 are connected by the camera cable 60.

The CCU 10 has a connector 12, a gain control amplifier (AGC) 13, an A/D converter (A/D) 14, and a digital signal processor (DSP) 15.

The CCU 10 further has a timing generator (TG) 16, a phase adjuster 17, a micro processing unit (MPU) 20, a DA converter (D/A) 21, a digital connector 22, and an analog connector 23. The CCU 10 further has a memory 24, and an oscillating circuit 25.

The camera cable 60 is connected to the connector 12. The connector 12 has connection terminals (not shown) corresponding to those of the camera cable 60.

The gain control amplifier 13 amplifies an image pickup signal hg0 output from the connector 12 to a level required of the A/D converter 14 and outputs the amplified signal as an image pickup signal hg1.

The A/D converter 14 receives a phase-adjusted A/D clock signal (ADCLK) from the phase adjuster 17, converts the image pickup signal hg1 into a digital signal in accordance with the phase-adjusted A/D clock signal and outputs the digital signal as an image pickup signal hg2.

The digital signal processor 15 receives a clock signal (CLK), an HD signal (horizontal synchronizing signal) and a VD signal (vertical synchronizing signal) from the timing generator 16, applies predetermined digital signal processing to the image pickup signal hg2 converted as a digital signal and outputs the processed signal as a video signal hg3 to display video on a display device not shown. The digital signal processor 15 further extracts a test image pickup signal thg2 corresponding to a test signal tsg (which will be described later) and outputs the test image pickup signal thg2 to the MPU 20.

The timing generator 16 may be configured by a device such as a field programmable gate array (FPGA). The timing generator 16 outputs the clock signal (CLK), the HD signal (horizontal synchronizing signal) and the VD signal (vertical synchronizing signal) to the digital signal processor 15 and the phase adjuster 17 and outputs the A/D clock signal (AD-CLK) to the phase adjuster 17.

The phase adjuster 17 performs phase adjustment of the clock signal (CLK) and phase adjustment of the A/D clock signal (ADCLK) in accordance with a control signal cg1 given from the MPU 20. The phase adjuster 17 outputs the HD signal (horizontal synchronizing signal) and the VD signal (vertical synchronizing signal) together with the phase-adjusted clock signal (CLK) to the camera head 50 through the connector 12 and outputs the phase-adjusted A/D clock signal (ADCLK) to the A/D converter 14.

The MPU 20 performs plateau search (which will be described later) based on the test image pickup signal thg2 The MPU 20 generates the control signal cg1 in accordance with a result of the plateau search so that the phase adjuster 17 can perform phase adjustment in accordance with the control signal cg1.

The MPU 20 outputs the thus generated control signal cg1 to the phase adjuster 17. The MPU 20 further controls the memory 24 to store plateau data indicating a horizontal plateau (or simply, plateau) searched for by the plateau search.

The DA converter (D/A) 21 converts the video signal hg3 into an analog signal and outputs the analog signal to the analog connector 23. The digital connector 22 is a connection terminal for outputting a digital video signal dg to the outside. The analog connector 23 is a connection terminal for outputting an analog video signal ag to the outside.

The oscillating circuit 25 generates a clock signal (CLK) with a predetermined frequency and outputs the generated clock signal (CLK) to the timing generator 16.

Figure 2:
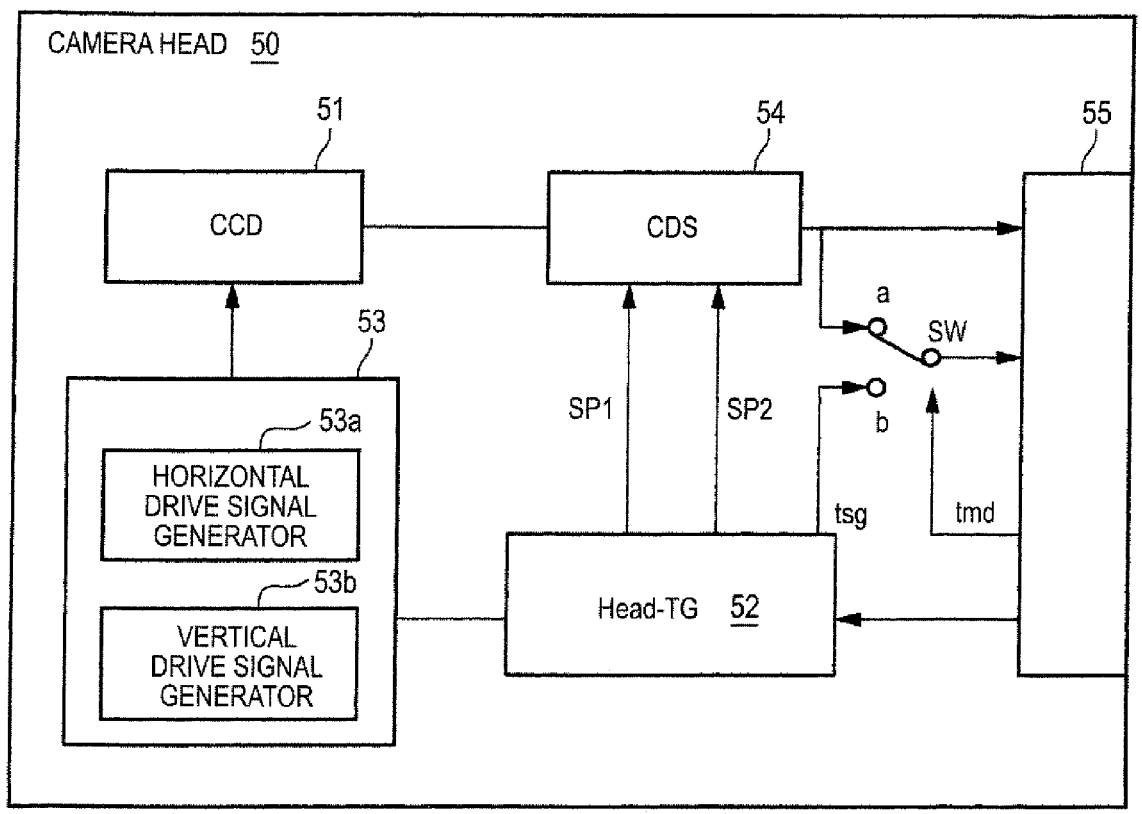
FIG. 2 is a block diagram showing the configuration of a camera head.

The configuration of the camera head 50 and the camera cable 60 will be described. As shown in FIG. 2, the camera head 50 has a CCD 51, a camera head timing generator (Camera head-TG) 52, a drive signal generator 53, a CDS circuit 54, a connector 55 for making connection to the camera cable 60, and a changeover switch SW.

The CCD 51 generates a pixel signal (image signal) corresponding to an optical image of a subject formed by a lens (not shown) provided in the camera head 50 and outputs the pixel signal to the CDS circuit 54.

The camera head timing generator (Camera head-TG) 52 functions as a pulse generator to generate sample pulses SP1 and SP2 in accordance with the clock signal (CLK) given through the connector 55 and output the generated sample pulses SP1 and SP2 to the CDS circuit 54. The camera head timing generator 52 converts the synchronizing signals VD and HD into signals suitable for the specification of the drive signal generator 53 and outputs the converted signals to the drive signal generator 53.

The drive signal generator 53 has a horizontal drive signal generator 53a and a vertical drive signal generator 53b for driving the CCD 51. The drive signal generator 53 outputs drive pulses for driving the CCD 51 to the CCD 51 in accordance with the synchronizing signals VD and HD given from the camera head timing generator 52.

The CDS circuit 54 performs co-related double sampling in accordance with the sample pulses SP1 and SP2 on the pixel signal given from the CCD 51 and outputs an image pickup signal hg0 after removal of reset noise. The changeover switch SW performs a changeover operation in accordance with a test mode control signal tmd to change one of an ordinary mode and a test mode over to the other. The ordinary mode and the test mode will be described later.

The camera cable 60 has signal wires 61, 62 and 63. The signal wire 61 is used for transmitting the phase-adjusted clock signal (CLK), the HD signal (horizontal synchronizing signal) and the VD signal (vertical synchronizing signal) from the CCU 10 to the camera head 50. The signal wire 62 is used for transmitting the image pickup signal hg0 from the camera head 50 to the CCU 10. The signal wire 63 is used for transmitting the test mode control signal tmd. The test mode control signal tmd is a signal for changing the operation mode between the test mode and the image pickup mode.

The imaging apparatus 1 configured as described above is configured to operate in the test mode in addition to the normal image pickup mode for picking up an image. In the image pickup mode, the changeover switch SW is connected to the terminal a side in accordance with the test mode control signal tmd given from the MPU 20. An image pickup signal hg0 corresponding to video captured by the camera head 50 is input into the gain control amplifier 13 through the connector 12. Then, the A/D converter 14 outputs an image pickup signal hg2, the digital signal processor 15 outputs a video signal hg3 and the digital connector 22 outputs a video signal dg to the outside, so that video is displayed on an external display device.

On the other hand, the test mode is a mode for suitably performing signal processing in accordance with the delay time of the camera cable 60. When the imaging apparatus 1 operates in the test mode, the changeover switch SW is connected to the terminal b side in accordance with the test mode control signal tmd given from the MPU 20. Then, a test signal (tsg) generated by the camera head timing generator (Camera head-TG) 52 is output. In the imaging apparatus 1, a pixel signal output from the CCD 51 is input into the CDS circuit 54. Then, signal processing for the pixel signal is performed by the CDS circuit 54, the gain control amplifier 13 and the A/D converter 14. The MPU 20 operates as a phase control unit in accordance with a test image pickup signal thg2 obtained as a result of the signal processing and outputs a control signal cg1 for controlling phase adjustment in the phase adjuster 17.

Figure 3:
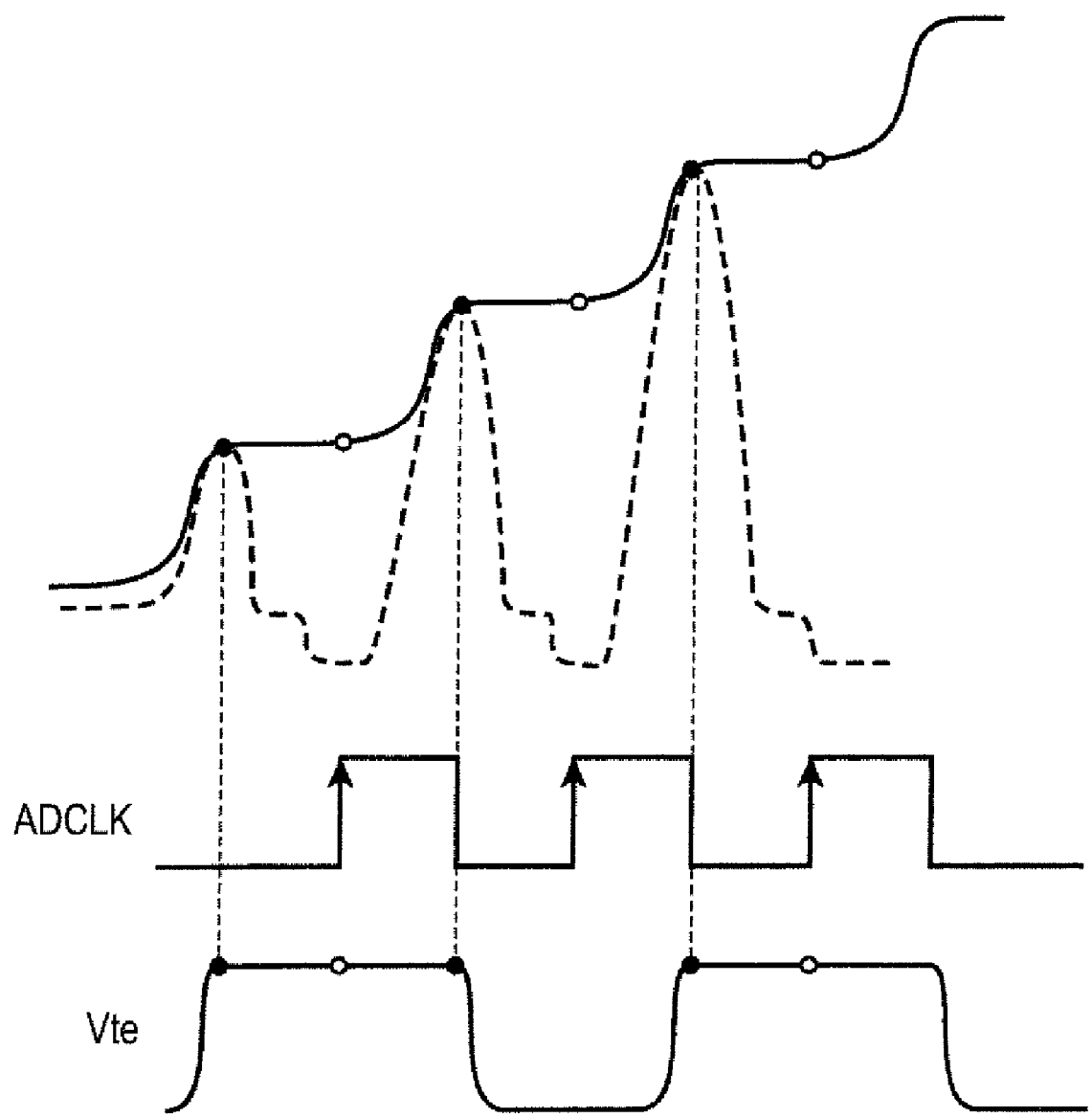
FIG. 3 is a graph showing waveforms of a signal, an A/D clock signal (ADCLK) and a test signal Vte input into an A/D converter.

Then, in the imaging apparatus 1, the phase adjuster 17 performs phase adjustment of the A/D clock signal (ADCLK) so that signal processing in the A/D converter 14 can be optimized. FIG. 3 is a graph showing waveforms of the video signal hg1, the A/D clock signal ADCLK and the test signal Vte input into the A/D converter 14. The test signal Vte is roughly shaped like a rectangular wave. The broken line portion shown in FIG. 3 expresses waveform characteristic of a signal obtained by inverting the input signal given from the CDS circuit 54. The solid line portion shown in FIG. 3 expresses waveform characteristic of a signal output from the CDS circuit 54 (practically through the AGC) in accordance with the sample pulses SP1 and SP2 but not input into the A/D converter 14 yet. The test signal Vte is set as a signal (rectangular wave) having the same change point as that of the real video signal (CDS output).

In the A/D converter 14, sampling of an input signal is performed in accordance with the A/D clock signal (AD-CLK). For this reason, though an appropriate signal can be output when a leading edge of the A/D clock signal (ADCLK) coincides with a horizontal flat portion where signal level is substantially unchanged (referred to as plateau) of the input signal as shown in FIG. 3, an appropriate signal cannot be output when the phase of the A/D clock signal is shifted so that the leading edge comes out of the plateau.

Therefore, in the imaging apparatus 1, while the MPU 20 operates as a phase control unit to output a control signal cg1 to control phase adjustment in the phase adjuster 17, the MPU 20 operates as a plateau search unit to search for the plateau of an input signal input into the A/D converter 14. Generally, the phase adjuster 17 is a circuit which can finely shift the phase of an output clock relative to an input clock by using PLL technology.

Figure 4:
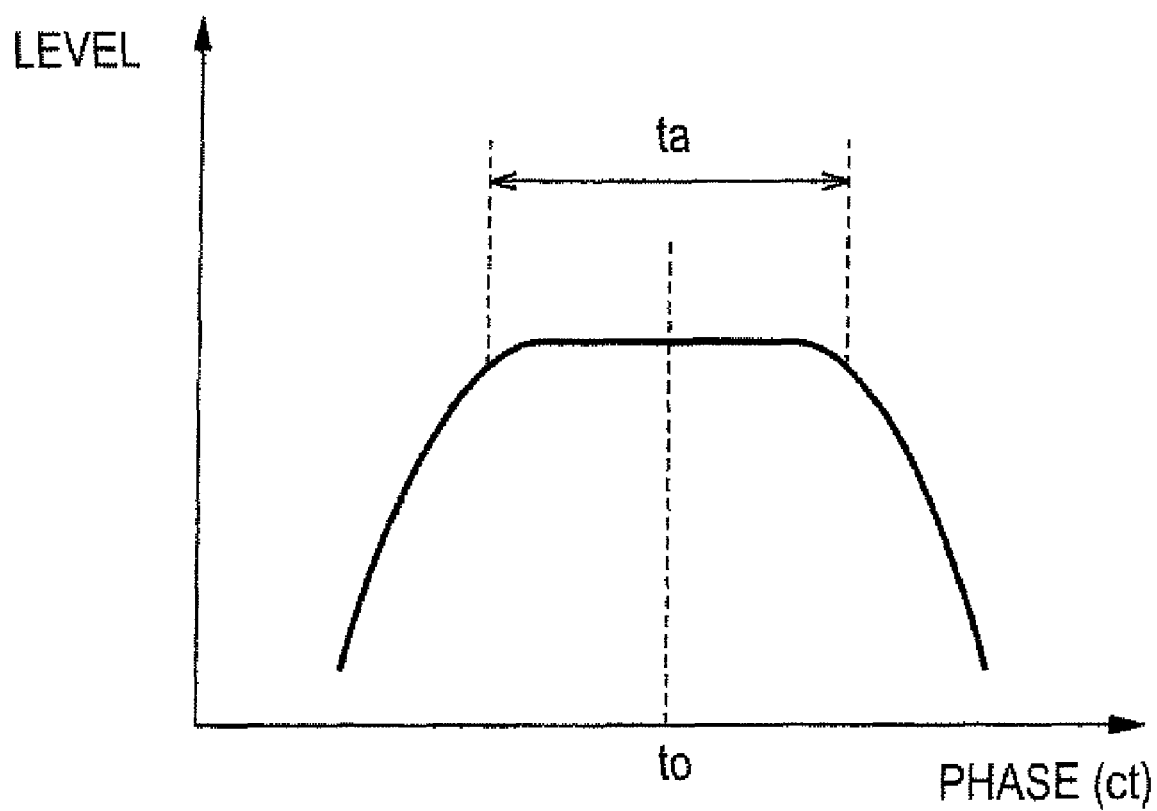
FIG. 4 is a graph showing an example of a target for plateau search.

In this case, as shown in FIG. 4, for example, the MPU 20 searches for a center portion t10 of a plateau as a target point and regards a range ta containing the detected center portion t0 as a plateau. The plateau can be detected in such a manner that the level of the A/D-converted image pickup signal hg2 is detected and compared in accordance with each clock phase adjusted (shifted) by the phase adjuster 17. When the level of the image pickup signal hg2 is detected, a predetermined range (e.g. center portion) of a screen is generally integrated in order to eliminate the influence of noise. The integration is performed by the digital signal processor 15, so that a result of the integration is detected by the MPU 20 to thereby determine the level.

When there is a plateau found, the MPU 20 controls the memory 24 to store plateau data indicating the phase of the A/D clock signal (ADCLK) at this point of time. Thus, the phase control in this case results in that the leading edge (upward arrow portion in FIG. 3) of the A/D clock signal (ADCLK) substantially coincides with the center portion (the portion marked with a white dot in FIG. 3) of the plateau of the video signal.

After the plateau data are stored in the memory 24, the MPU 20 outputs a control signal cg1 corresponding to the plateau data to the phase adjuster 17. As a result, the A/D clock signal whose phase is adjusted to an optimum value is input into the A/D converter 14. Therefore, the imaging apparatus 1 can suitably perform signal processing in accordance with the delay time caused by the camera cable 60 so that basic performance (resolution, S/N, sensitivity, etc.) can be kept at a desired level even when the camera cable 60 is long. When there are camera cables 60 having the same length in external appearance, signal processing in accordance with the delay time caused by the length of each of the camera cables can be performed suitably. Therefore, the imaging apparatus 1 can avoid the influence of variation of the length of the camera cable 60.

For adjustment of the phase of the A/D clock signal, the imaging apparatus 1 may perform phase adjustment by using not the test signal Vte but image pickup data obtained by picking up an image of a test chart called multi burst. On this occasion, it is preferable that phase adjustment of the A/D clock signal is performed so as to be suitable for a higher frequency portion.

Figure 5:
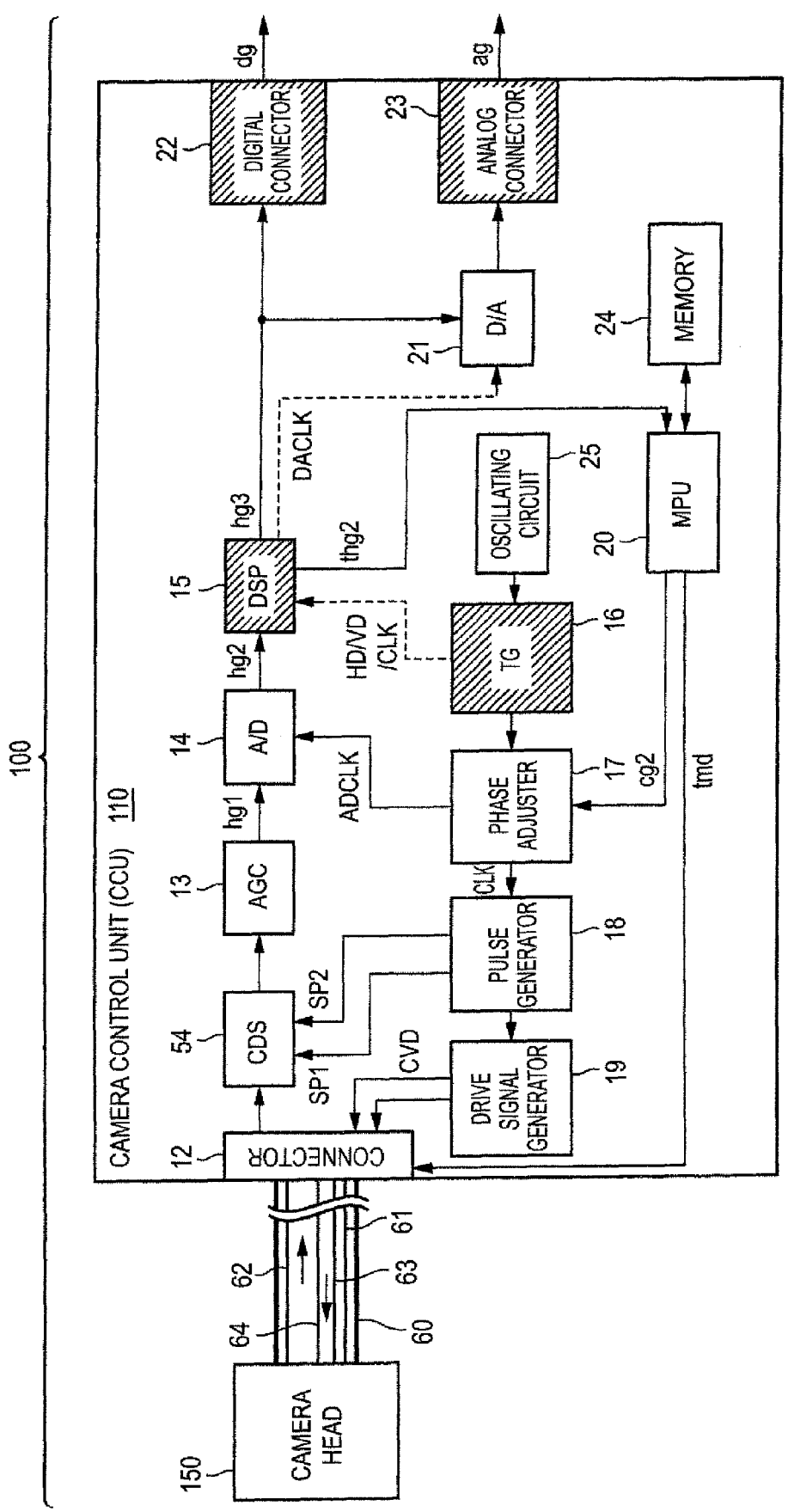
FIG. 5 is a block diagram showing a configuration of an imaging apparatus according to another embodiment of the invention.
Figure 6:
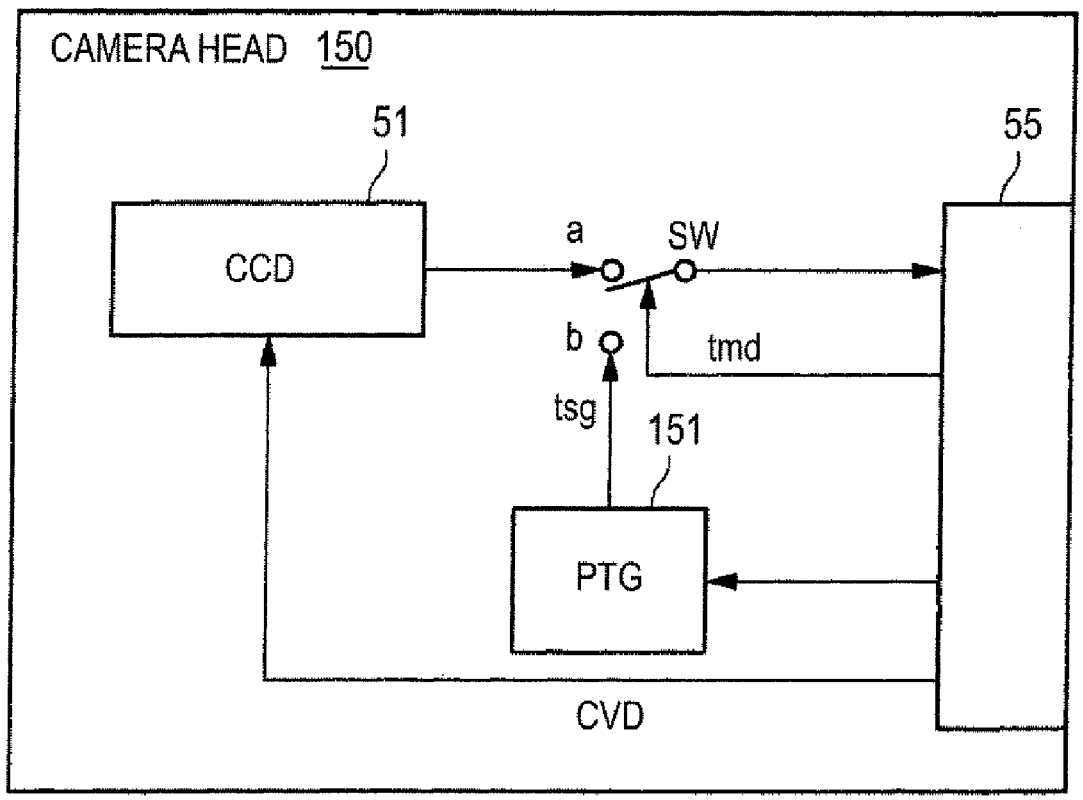
FIG. 6 is a block diagram showing the configuration of a camera head in the imaging apparatus shown in FIG. 5.

An imaging apparatus 100 according to another embodiment will be described below. FIG. 5 is a block diagram showing the configuration of the imaging apparatus 100. FIG. 6 is a block diagram showing the configuration of a camera head 150. The imaging apparatus 100 includes a CCU 110, a camera head 150, and a camera cable 60. The CCU 110 and the camera head 150 are connected to each other by the camera cable 60.

The point of difference of the CCU 110 from the CCU 10 is as follows. The CCU 110 has a CDS circuit 54 between the connector 12 and the gain control amplifier 13. The CCU 110 has a pulse generator 18 and a drive signal generator 19 between the phase adjuster 17 and the connector 12. The phase adjuster 17 of the CCU 110 outputs a phase-adjusted clock signal (CLK) to the pulse generator 18. The pulse generator 18 generates phase-adjusted sample pulses SP1 and SP2 in accordance with the phase-adjusted clock signal (CLK) and outputs the phase-adjusted sample signals SP1 and SP2 to the CDS circuit 54. The drive signal generator 19 outputs a drive pulse CVD for driving the CCD 51 to the CCD 51.

As shown in FIG. 6, the point of difference of the camera head 150 from the camera head 50 is as follows. The camera head timing generator 52, the drive signal generator 53 and the CDS circuit 54 are not provided in the camera head 150. The camera head 150 has a pattern generator (PTG) 151. A drive pulse CVD for driving the CCD 51 is fed from the CCU 110 through a signal wire 64.

The pattern generator 151 generates a test signal tsg and outputs the test signal tsg to the CCU 110 through the connector 55. The pattern generator 151 functions as a test signal generator. Incidentally, the test signal tsg corresponds to a pixel signal obtained when an image of a white wall is picked up by the camera head 150.

In the same manner as the imaging apparatus 1, the imaging apparatus 100 operates in the test mode. When the imaging apparatus 100 operates in the test mode, the changeover switch SW is connected to the terminal b side in accordance with the test mode control signal tmd given from the MPU 20. Then, the test signal tsg generated by the pattern generator 151 is input into the CDS circuit 54 of the CCU 110. Signal processing of the test signal tsg is performed by the COS circuit 54, the gain control amplifier 13 and the A/D converter 14. The MPU 20 operates as a phase control unit in accordance with a test image pickup signal thg2 obtained as a result of the signal processing to output a control signal cg2 to control phase adjustment in the phase adjuster 17. On this occasion, the MPU 20 performs peak range search (which will be described later) based on the test image pickup signal thg2. The MPU generates a control signal cg1 in accordance with a result of the peak range search so that the phase adjuster 17 can perform phase adjustment based on the control signal cg1.

Figure 7:
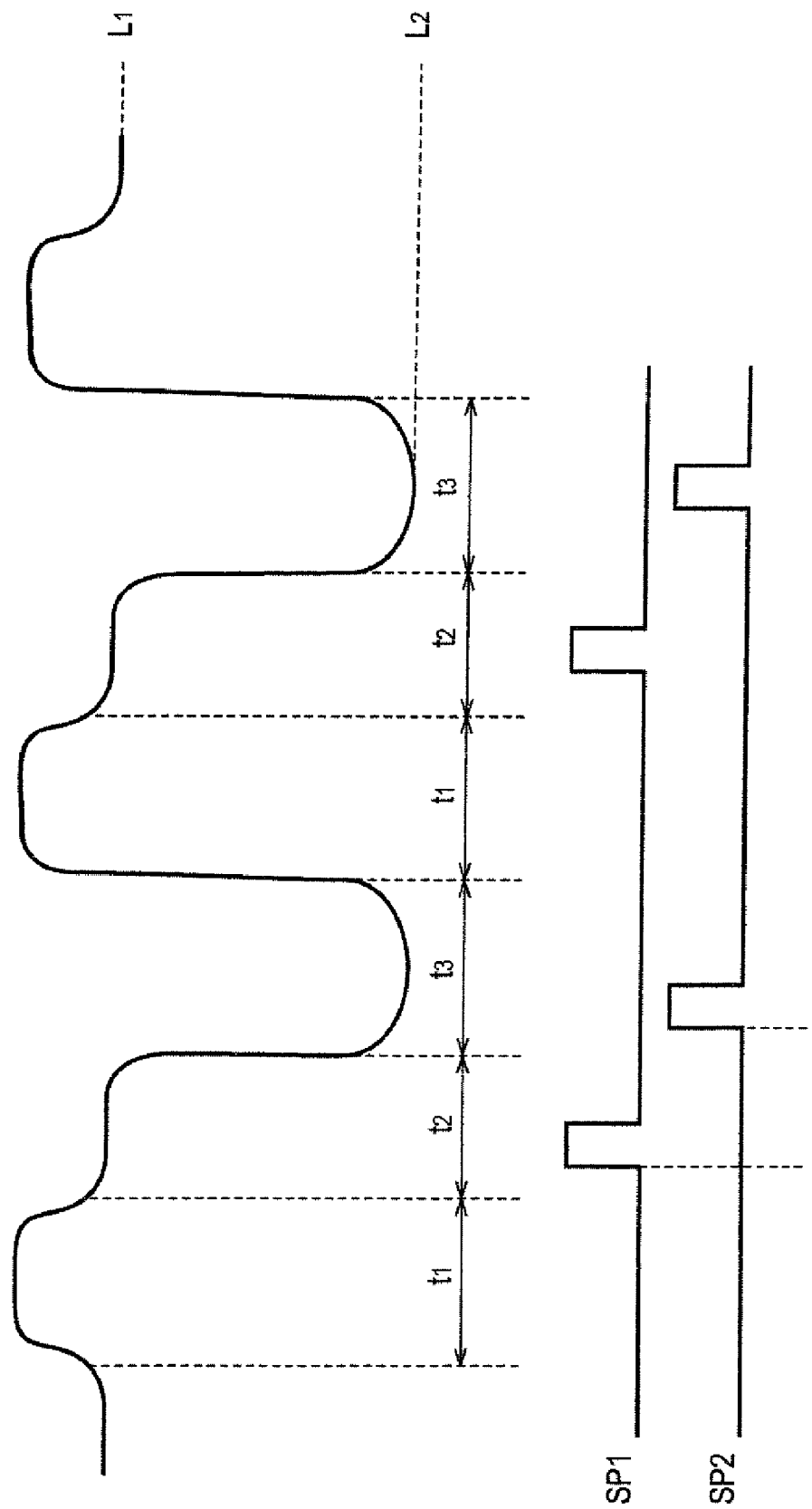
FIG. 7 is a graph showing waveforms of signals input into a CDS circuit.

FIG. 7 is a graph showing waveforms of signals input into the CDS circuit 54. As shown in FIG. 7, the pixel signal output from the CCD 51 is a signal having a repeating unit consisting of a reset period t1, a field through period t2, and a signal period t3. The CDS circuit 54 outputs a field through level (black level) L1 and a signal level L2 clamped with the sample pulses SP1 and SP2 in order to extract a level difference between the levels L1 and L2 in the signal period t3 as a signal.

When the timing of the sample pulses SP1 and SP2 input into the CDS circuit 54 is shifted, the level difference between the signals clamped with the sample pulses SP1 and SP2 varies to cause inaccuracy of the black level and lowering of the signal level. It is therefore important that the sample pulses SP1 and SP2 are input into the CDS circuit 54 in accurate timing. There is however a possibility that the input timing of the sample pulses SP1 and SP2 may be shifted from accurate timing when the camera cable 60 is so long that the signal delay becomes large and the individual variation of the cable length becomes wide.

The sample pulses SP1 and SP2 are generated by the pulse generator 18. The pulse generator 18 generates the sample pulses SP1 and SP2 with a phase corresponding to the phase of the clock signal CLK. Accordingly, the phases of the sample pulses SP1 and SP2 can be adjusted collectively by adjustment of the phase of the clock signal CLK.

Incidentally, when the phases of the sample pulses SP1 and SP2 are changed (the sample pulses SP1 and SP2 are shifted left or right collectively in FIG. 7), the signal level difference output from the CDS circuit 54 changes because the timing of the field through level L1 and the signal level L2 clamped by the CDS circuit 54 changes.

Figure 8A:
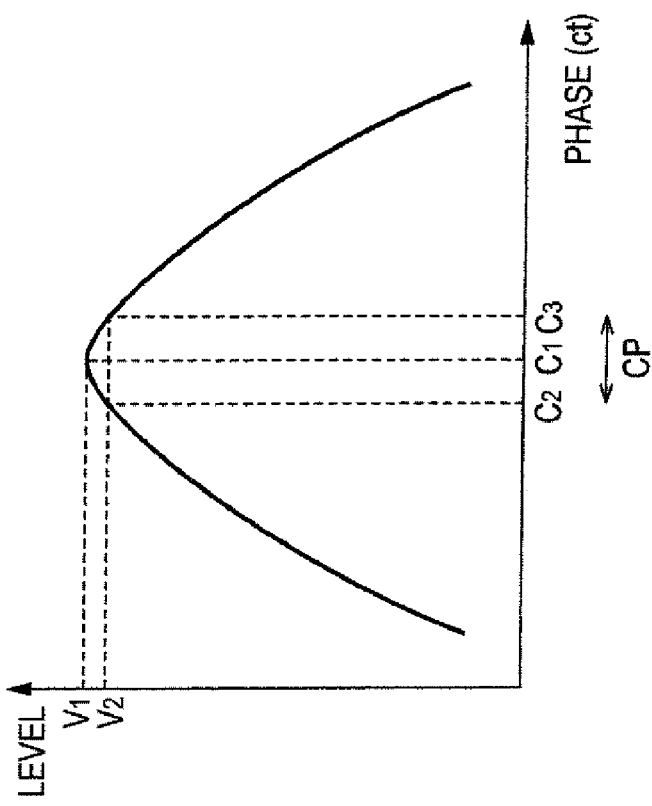
Figure 8B:
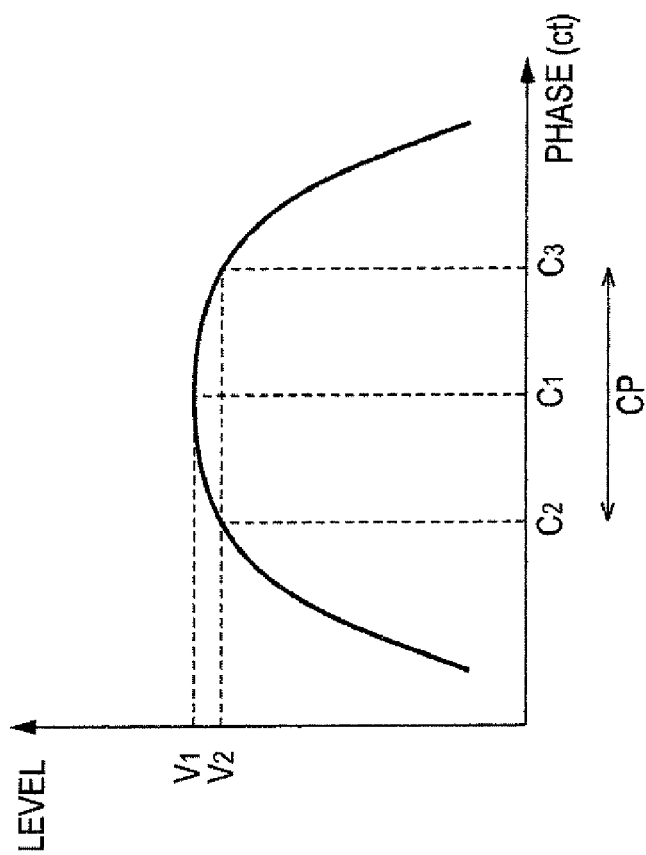

When the signal level output from the CDS circuit 54 at the time of changing the phases of the sample pulses SP1 and SP2 is plotted, graphs as shown in FIGS. 8A and 8B are obtained. FIG. 8A shows the case where the test signal tsg is input. In this case, a phase range in which the signal level is equal to or higher than the level V2, inclusive of the peak level V1, forms a peak range CP which is wide. FIG. 8B shows the case where the real video is taken. In this case, the peak range is narrow. Incidentally, the peak range is a range which is formed between phases C2 and C3 giving the level V2 and which includes a phase C1 giving the peak level V1. In other words, the peak range means a phase range in which the difference between the peak level V1 and the level V2 is in a predetermined range (e.g. of about several percent) so that the level is a little changed but roughly flattened.

In the case of FIG. 8A, when the level of the signal output from the CDS circuit 54 comes out of the peak range CP, the original signal level included in the image pickup signal obtained by the CCD 51 cannot be obtained. It is therefore preferable that the phases of the sample pulses SP1 and SP2 are in the peak range CP. Therefore, in the imaging apparatus 100, phase adjustment is performed while peak range search is performed as follows.

When a test signal tsg is input into the CDS circuit 54 through the camera cable 60, a test image pickup signal thg2 corresponding to the test signal tsg is output from the digital signal processor 15 to the MPU 20. Since the test signal tsg is input into the CCU 110 through the camera cable 60, the influence of the delay due to the camera cable 60 is included in the test image pickup signal thg2. The MPU 20 operates as a peak search unit based on the test image pickup signal thg2 to output a control signal cg2 to the phase adjuster 17 until the aforementioned peak range CP is found. In this case, the MPU 20 outputs the control signal cg2 to the phase adjuster 17 while changing the control signal cg2 until the phases C2 and C3 giving the level V2 are found.

The phase adjuster 17 adjusts the phase of the clock signal CLK in accordance with the control signal cg2 and outputs the phase-adjusted clock signal CLK to the pulse generator 18. When the phase-adjusted clock signal CLK is output, the pulse generator 18 outputs phase-adjusted sample pulses SP1 and SP2 to the CDS circuit 54.

When the peak range CP is found, that is, when the phases C2 and C3 giving the level V2 are found, the MPU 20 controls the memory 24 to store peak range data (data indicating the phases C2 and C3) indicating the peak range CF.

When the peak range data are stored in the memory 24, the MPU 20 outputs a control signal cg2 corresponding to the peak range data to the phase adjuster 17. As a result, sample pulses SP1 and SP2 whose phases are adjusted to optimum values are input into the CDS circuit 54. Accordingly, in the imaging apparatus 100, signal processing in accordance with the delay time due to the camera cable 60 can be performed suitably so that basic performance (resolution, S/N, sensitivity, etc.) can be kept at a desired level even when the camera cable 60 is long.

Moreover, in the imaging apparatus 100, the signal wires 61 and 62 used for normal image pickup are used for the aforementioned phase adjustment. Therefore, the imaging apparatus 100 need not have any dedicated signal (return clock) and circuit (such as a PLL circuit) for phase adjustment.

Moreover, the aforementioned phase adjustment can be performed regardless of the length of the camera cable 60. Therefore, desired performance can be kept while the influence of variation of the length can be avoided regardless of the length of the camera cable 60. Accordingly, the camera cable 60 can be made longer than ever while desired performance can be kept.

Since desired performance can be kept even when requirements for various specifications of the camera cable 60 are loosened, the cost of the camera cable 60 can be reduced consequently.

Particularly since the phase of the A/D clock signal (AD-CLK) is interlocked with the phases of the sample pulses SP1 and SP2, the phase of the A/D clock signal (ADCLK) can be optimized by the aforementioned phase adjustment of the sample pulses SP1 and SP2 in the imaging apparatus 100.

The imaging apparatus 100 can suitably perform signal processing in accordance with the delay time due to the camera cable 60 and can keep basic performance at a desired level even when the camera cable 60 is long.

Figure 9:
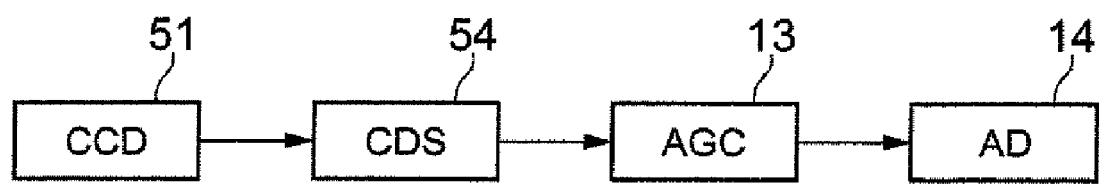
FIG. 9 is a block diagram showing a main configuration of a single-plate imaging apparatus.
Figure 10:
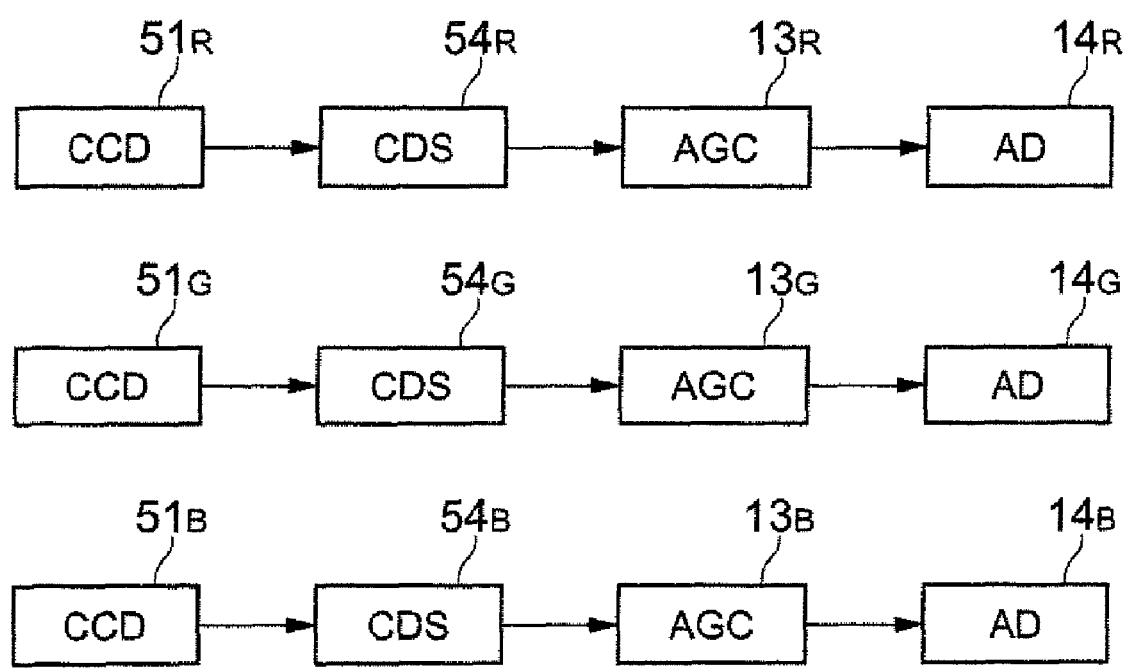
FIG. 10 is a block diagram showing the main configuration of a three-chip imaging apparatus.

In the above description, the imaging apparatuses 1 and 100 are described as a single-chip imaging apparatus having a single imaging device of the CCD 51 and a single signal processing system for the CCD 51 including the CDS circuit 54, the gain control amplifier 13 and the A/D converter 14, as shown in FIG. 9. The single-chip imaging apparatus performs processing for three color signals R, G and B by the single signal processing system. However, the imaging apparatuses 1 and 100 may be embodied as a three-chip imaging apparatus having three imaging devices of the CCD 51 (51R, 51G, 51B), and three sets of signal processing systems for the CCD 51 (51R, 51G, 51B) including the CDS circuits 54 (54R, 54G, 54B) the gain control amplifier 13 (13R, 13G, 13B) and the A/D converter 14 (14R, 14G, 14B) as shown in FIG. 10. The three-chip imaging apparatus performs processing for the three color signals R, G and B with the three sets of signal processing systems respectively.

When the three color signals R, G and B are displaced, that is, when delay time varies in each of the three color signals R, G and B, color reproducibility will be deteriorated. Moreover, when resolution is improved by pixel shift of each CCD, it is necessary to reduce variation of delay time among pixels (R, G and B). Particularly in the case of the three-chip imaging apparatus, it is therefore important to reduce variation of delay time in each of the three color signals R, G and B. Accordingly, in the case of a three-chip imaging apparatus, the aforementioned phase adjustment becomes more effective because the level of spec required for reducing variation of delay time becomes higher.

Each of the components (such as the camera head timing generator 52) described in the aforementioned embodiments are described as an example for implementing the invention. The invention can be applied to an imaging apparatus using other components and circuits.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A head separation type camera comprising:
    a camera head provided with an image pickup device and camera control unit to which the camera head is connected;
    wherein the camera control unit comprises:
    a CDS circuit that performs co-related double sampling on an output signal of the image pickup device in accordance with an input pulse;
    a phase adjusting unit that performs phase adjustment of a clock signal and outputs an adjusted clock signal being performed with the phase adjustment;
    a pulse output unit that generates a sample pulse being adjusted with a phase thereof in accordance with the adjusted clock signal being input from the phase adjusting unit;
    a peak search unit that performs a search for a peak range with respect to a signal output from the CDS circuit; and
    a phase control unit that controls the phase adjustment of the clock signal in the phase adjusting unit so as that the phase of the sample pulse generated by the pulse output unit becomes within the peak range being searched by the peak search unit.

2. The head separation type camera of claim 1, wherein the camera head comprises a test signal generating unit that generates a test signal for performing the search for the peak range by the peak search unit and outputs the test signal to the CDS circuit in place of the output signal of the image pickup device.

3. The head separation type camera of claim 2, wherein the peak search unit performs the search for the peak range with respect to the signal output from the CDS circuit for the test signal generated by the test signal generating unit.

4. The head separation type camera of claim 3, wherein the test signal is a signal corresponding to a pixel signal obtained when an image of a white wall is captured.

5. The head separation type camera of claim 3, wherein the camera control unit further comprises a storage that stores peak range data that indicates the peak range searched by the peak search unit.

6. The head separation type camera of claim 2, wherein the test signal is a signal corresponding to a pixel signal obtained when an image of a white wall is captured.

7. The head separation type camera of claim 2, wherein the camera control unit further comprises a storage that stores peak range data that indicates the peak range searched by the peak search unit.

8. The head separation type camera of claim 1, wherein the camera control unit further comprises a storage that stores peak range data that indicates the peak range searched by the peak search unit.

* * * * *